(12) United States Patent
Aoki et al.

(10) Patent No.: US 7,389,926 B2
(45) Date of Patent: Jun. 24, 2008

(54) CAMERA MODULE AND METHOD OF ASSEMBLING SAME

(75) Inventors: Takashi Aoki, Musashimurayama (JP); Ikuo Kikuchi, Saitam (JP); Shigeki Horiguchi, Tokyo (JP); Kazukuni Hosoi, Kawaguchi (JP)

(73) Assignee: Optoelectronics Co., Ltd., Saitama Pref. (JP)

( * ) Notice: Subject to any disclaimer, the term of this patent is extended or adjusted under 35 U.S.C. 154(b) by 0 days.

(21) Appl. No.: 11/376,978

(22) Filed: Mar. 16, 2006

(65) Prior Publication Data

US 2007/0215703 A1    Sep. 20, 2007

(51) Int. Cl.
*G06K 7/10* (2006.01)
(52) U.S. Cl. ............ 235/454; 235/400; 235/472.01; 235/462.24; 235/462.41; 235/462.42; 235/462.43; 235/462.44

(58) Field of Classification Search ............ 235/375, 235/400, 451, 454, 472.01, 462.24, 462.41–462.4, 235/492; 716/1
See application file for complete search history.

(56) References Cited

U.S. PATENT DOCUMENTS

| | | | | |
|---|---|---|---|---|
| 5,920,061 | A * | 7/1999 | Feng | 235/472.01 |
| 6,318,637 | B1 * | 11/2001 | Stoner | 235/472.01 |
| 6,695,209 | B1 * | 2/2004 | La | 235/462.2 |
| 2004/0159703 | A1 * | 8/2004 | Kogan et al. | 235/454 |
| 2004/0195328 | A1 * | 10/2004 | Barber et al. | 235/454 |

* cited by examiner

*Primary Examiner*—Michael G. Lee
*Assistant Examiner*—Allyson N. Trail
(74) *Attorney, Agent, or Firm*—Kaplan Gilman Gibson & Dernier LLP

(57) ABSTRACT

An image capture device and method of assembling same is disclosed which provides an improved technique of mounting a CMOS detector and also isolates the optics for image capture from the optics for illumination, thereby simplifying the adjustment process. An exemplary arrangement using the camera module is also shown.

6 Claims, 7 Drawing Sheets

CAMERA MODULE AND METHOD OF ASSEMBLING SAME

TECHNICAL FIELD

This invention relates to a camera module, and more specifically, to a camera module and a method of assembling same with particular advantageous use in the capture of two-dimensional bar codes and similar symbols.

BACKGROUND OF THE INVENTION

Two-dimensional bar code symbol capture devices are known in the art. An example of such device is shown in U.S. Patent Publication No. 2003/0089776, a figure from which is reproduced as FIG. 1 here.

These image capture devices typically include a CMOS or other type of light sensor that comprises an array of sensing elements, each of which outputs an electrical signal proportional or in some way related to the amount of incident light. The image may then be stored electronically for later processing or reproduction.

Such image capture devices typically include the sensor mounted on a printed circuit board (PCB) and placed behind a set of one or more lenses, as shown in the '776 publication cited above, and in FIG. 1 hereof. Additionally, the prior art image capture devices often include an illumination means, a set of several light sources to light up the symbol being imaged, and to help aim the image capture device at the symbol to be captured.

The aiming light is used to help ascertain where to position the image capture device. By positioning the aiming light, often implemented as a series of LEDS, in the correct place, a user can ascertain when the image capture device is correctly positioned to be activated for capturing the desired image.

Several problems exist with these prior art devices. First, any lenses associated with the illumination LEDs must be correctly adjusted to properly illuminate the symbol or image to be captured. Specifically, the distance between the lens and the illumination and aiming LEDs must be correctly set.

However, the additional lens or lenses employed to direct light reflected from the image onto the sensor must also be adjusted, so that the distance between these additional lenses and the sensor are also correct. Because these two adjustments are related in a rather complicated and nonlinear fashion, it is very difficult to properly adjust focal lengths in an arrangement such as that shown in the '776 publication.

Another problem in such systems results from the type of sensor array utilized. More specifically, these types of sensor arrays may be packaged in several different types of packages, such as bare chip mount, ceramic packaging, or what has commonly become known as BGA or ball grid array packaging. Ball grid array packaging is a type of shell case packaging known in the art and which permits the size of the package to be minimized.

In the conventional image capture devices, BGA type of packaging is rarely if ever employed. One of the problems with BGA type packaging is that when mounted on a PCB for use in the camera module, stray light from the opposite side of the PCB reaches the BGA packaged sensor array, and causes distortion of the image. However, BGA type of packaging is beneficial for making the camera module as small as possible. Therefore, there are competing requirements when this type of packaging is employed.

In view of the foregoing, there exists a need in the art for a more efficient image capture device utilizing BGA type sensors.

SUMMARY OF THE INVENTION

The above and other problems of the prior art are overcome, and a technical advance is achieved in accordance with the present invention which relates to a novel assembly method for such image capture devices, and the resulting device.

DETAILED DESCRIPTION OF THE PREFERRED EMBODIMENTS

FIGS. 2A-E show an assembly process for the image capture device in accordance with the present invention. In accordance with one advantageous aspect of the invention, the assembly and adjustment of the aiming and illumination portion of the image capture device 216 is kept separate from that of the camera portion. This separation eliminates the difficulties caused by the trying to adjust all the lenses correctly when each adjustment affects the others.

Figure 1:
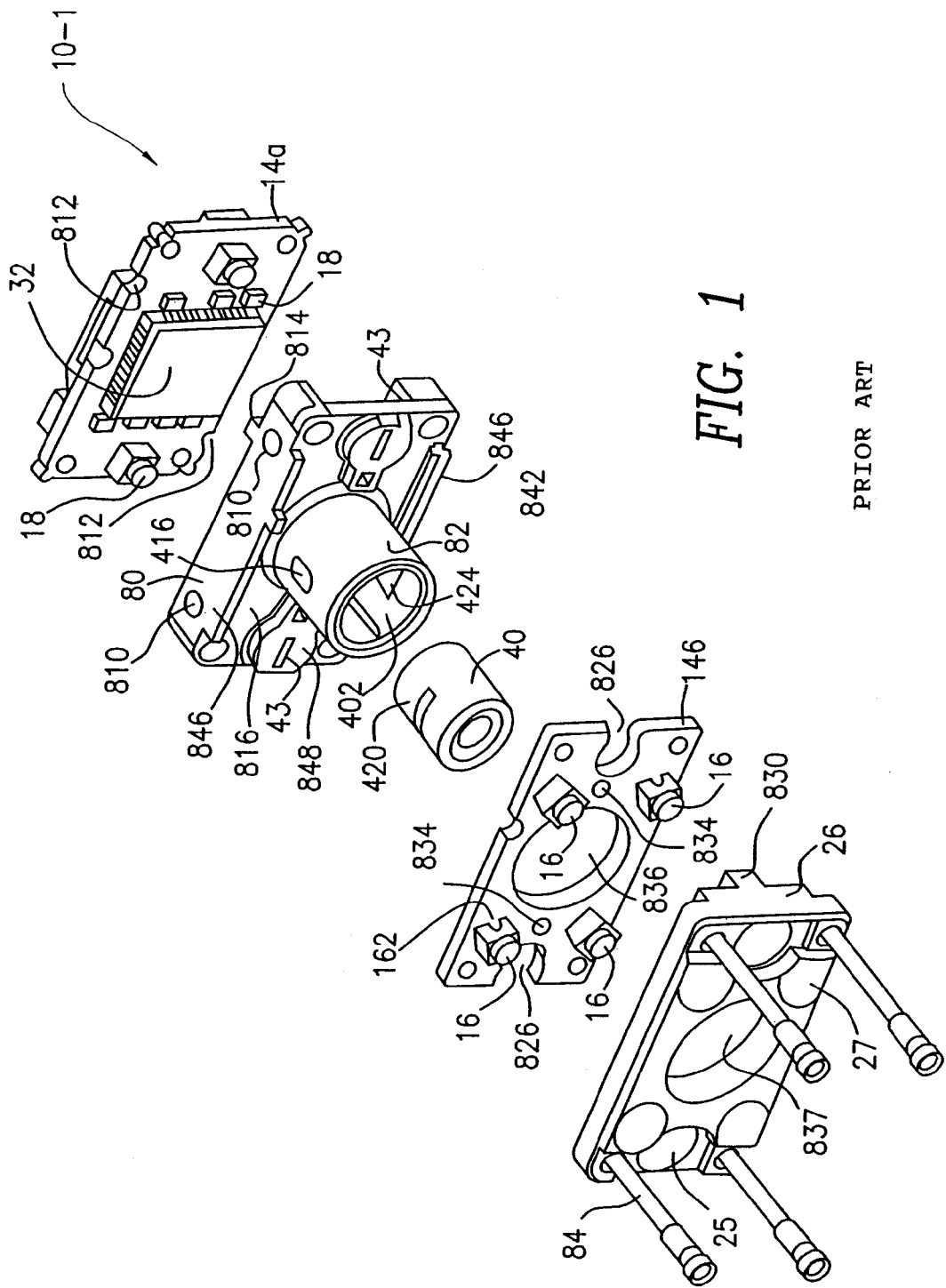
FIG. 1 shows a prior art two-dimensional image capture device.
Figure 2A:
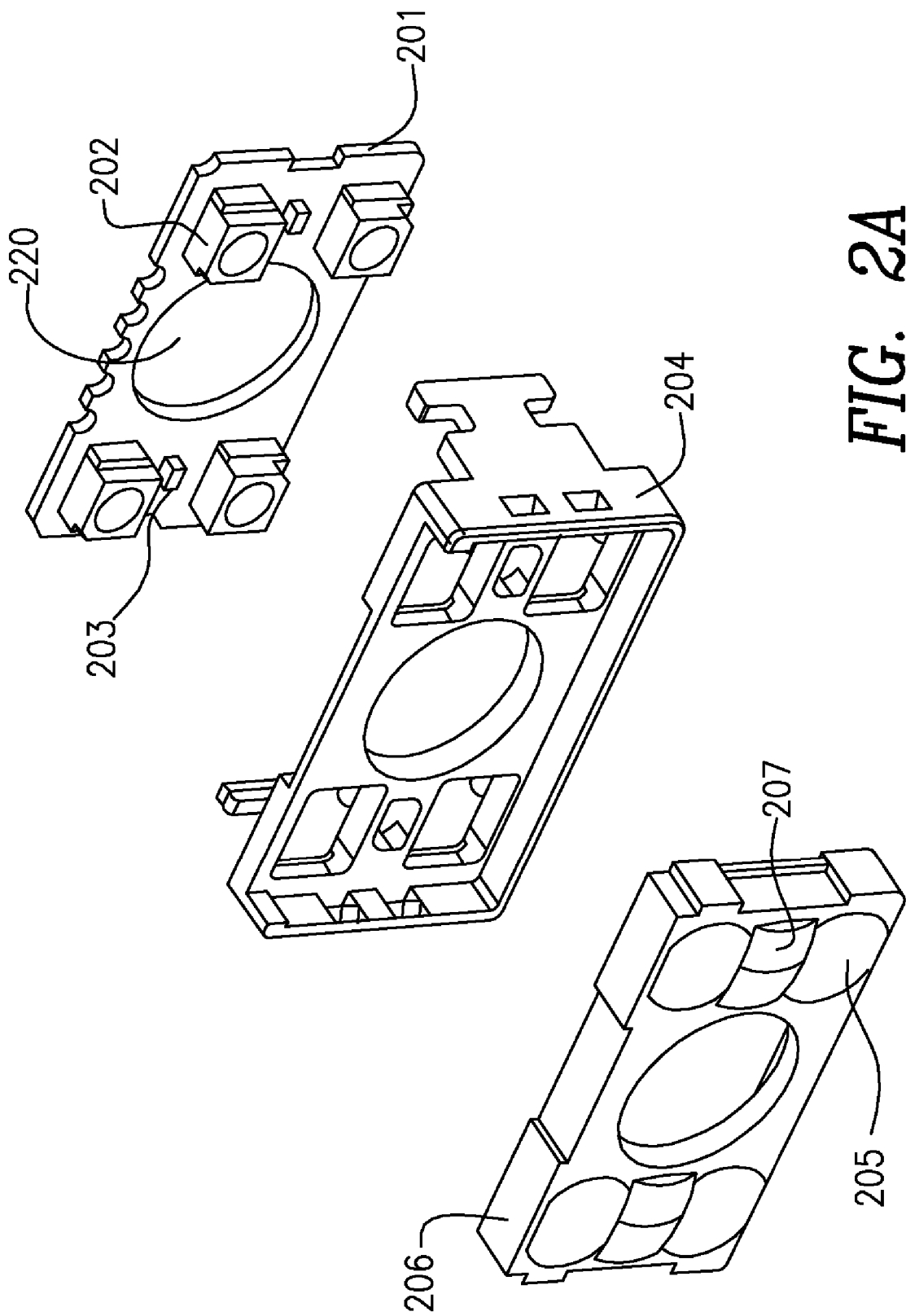
FIG. 2 shows an exemplary embodiment of a two-dimensional image capture device in accordance with the present invention, depicting also an exemplary assembly process therefore.

Turning to FIG. 2A, shown therein are an LED PCB 201 which is a circuit board that includes at least a set of illumination LEDs 202 and a set of aiming LEDs 203. The aiming LEDs 203 serve to "frame out" or otherwise designate the area to be imaged, so that a user can ascertain when the image capture device is properly positioned for activation. The illumination LEDs 202 provide the light to be reflected by the image for capture.

Figure 2B:
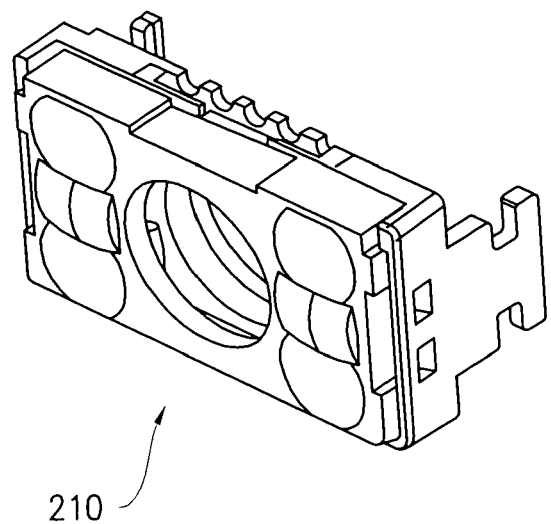

The assembly process begins by combining the LED PCB 201 with a body 204 and mask lens element 206. As indicated therein, the mask lens includes one or more lenses 205 that are lined with the illumination LEDs 202, and one or more lenses 207 that are aligned with the aiming LEDs 203. As shown in FIG. 2B, the resulting assembled device is an illumination element 210, which includes the LEDs and lenses for aiming and illuminating the symbol to be read. Whatever adjustments need to be made in terms of the distances between any of the illumination or aiming LEDs and the lenses can be made entirely independently of anything to do with the lens that is used for image capture of the reflected light, to be explained below.

Figure 2C:
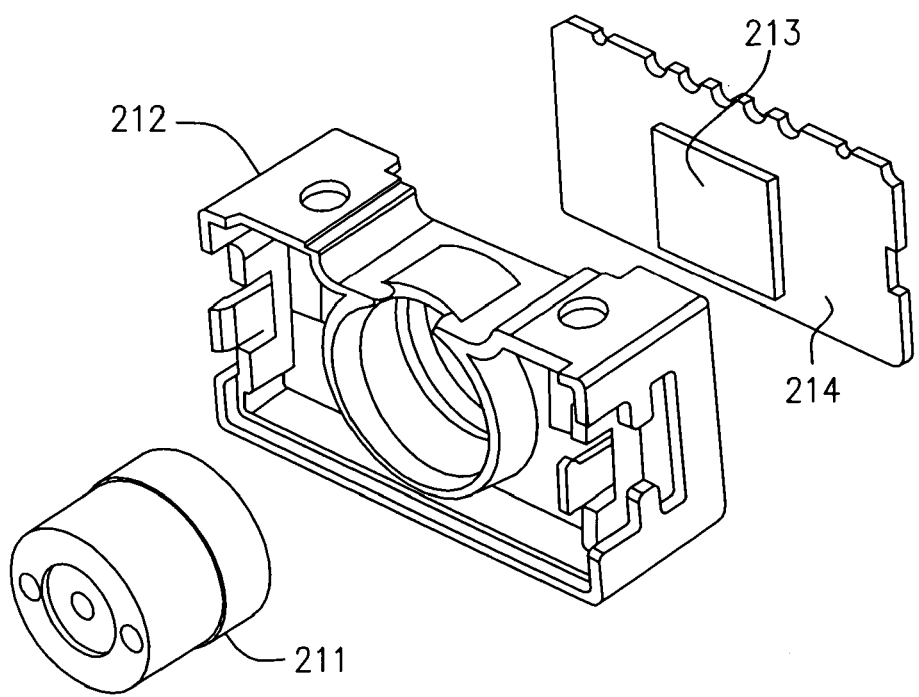

Turning to FIG. 2C, the figure includes a body 212 for mounting a lens 211. The lens 211 is utilized to capture and focus light returned from the image to be captured onto a detector 213, shown as CMOS mounted on a capturing PCB 213. It is understood that the invention is not limited to CMOS detectors, and any type of such detectors may be employed such as Charge Coupled Devices (CCD), etc.

Unlike the LED PCB 201, the capturing PCB 214 preferably does not have a hole in the middle thereof, as the hole 220 in the middle of PCB 201 is to allow the lens 211 to be assembled, as explained further below. The capturing PCB may have other electronic components such as gates, interface logic, connectors, etc. installed on a side opposite to that of sensor 213.

Figure 2D:
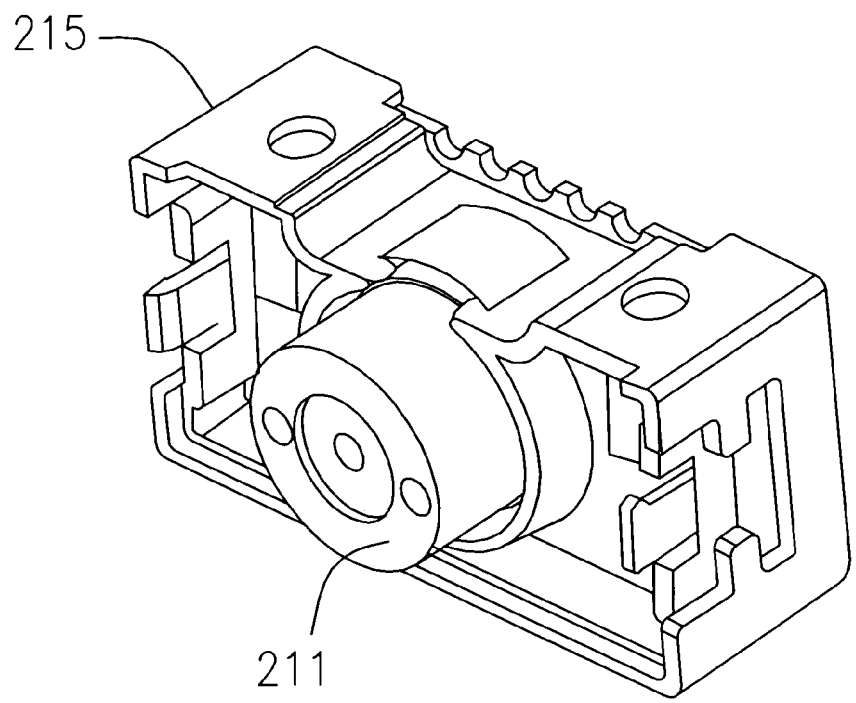
Figure 2E:
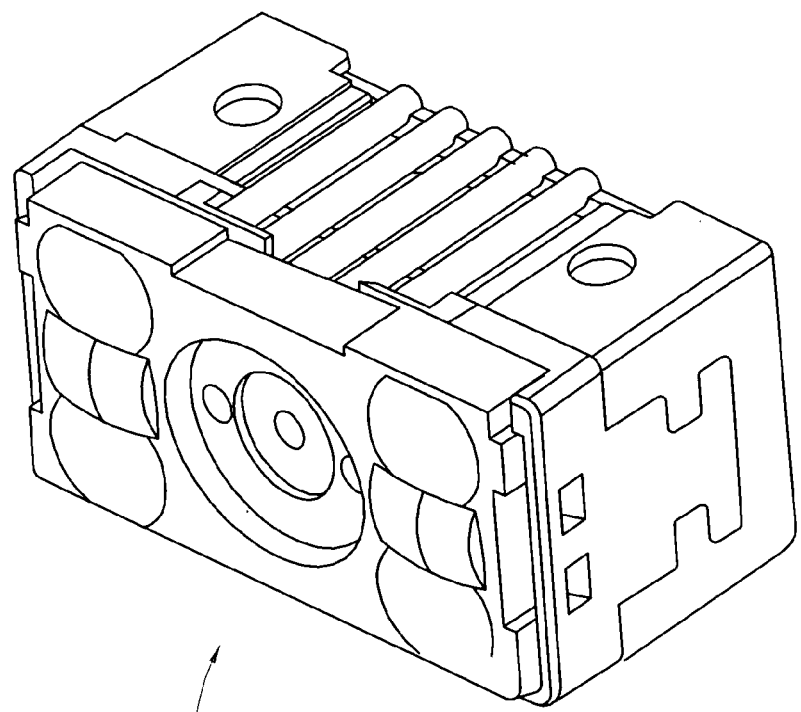

The final step in the process involves connecting the illumination element 210 with the camera module 215 shown in FIG. 2D, thereby connecting together the portions shown in FIGS. 2B and 2D.

Notably, however, the camera module 215 can be adjusted by moving the lens 211 to any desired distance without at all affecting focal points, distances, or other parameters associated with the aiming and illumination LED shown and described with respect to FIGS. 2A and 2B. Accordingly, all of the design parameters and adjustments can be done independently, thereby leading to a more streamlined and efficient assembly process. Any known mechanism for moving lens 211 in and out of body 212 for adjustment purposes may be utilized, such as a slide fit with a lock screw, or a screw fit, etc.

Figure 3:
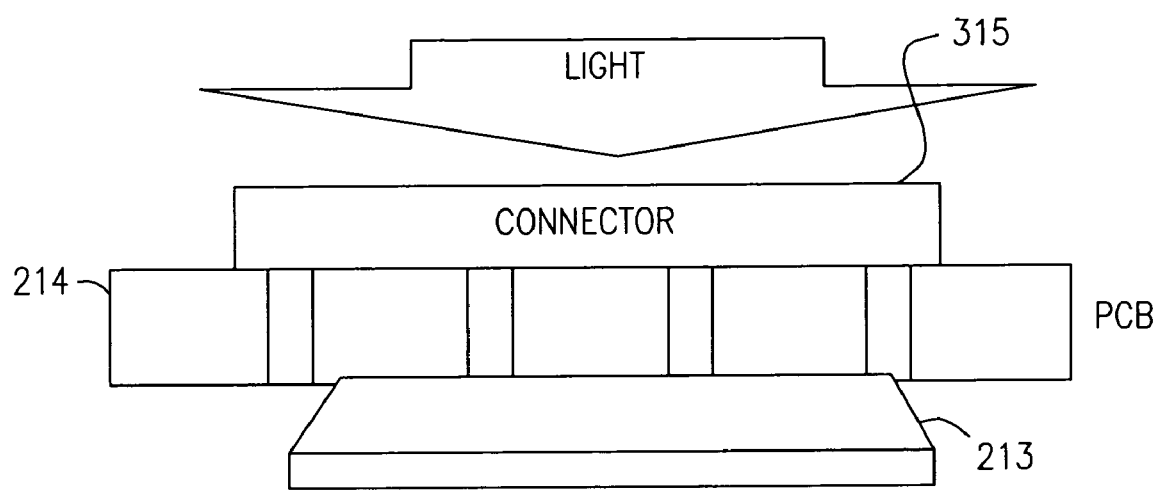
FIG. 3 depicts another exemplary embodiment showing the sensor mounted on a PCB.

Turning to the sensor PCB 214, a preferred manner of mounting the sensor on the PCB 214 is shown in FIG. 3. As indicated therein, the sensor 213 is placed on the PCB and a connector 315 for bringing signals to the remainder of the system is placed over the same area, on the opposite side of the PCB. Importantly, the connector is placed over the through holes in the PCB 214, in order to cut down and/or prevent light from leaking through the holes and distorting the image on sensor 213. As explained previously, this is particularly important in embodiments where the sensor 213 is packaged using BGA technology, as previously discussed.

Also as noted on FIG. 3, the connector may be replaced with any type of blocking mechanism such as tape, or an opaque material in order to prevent the light from passing. However, if the connector is utilized for the system anyway, then it simply can serve two purposes, and avoid an extra element utilized merely to block the light.

Figure 4:
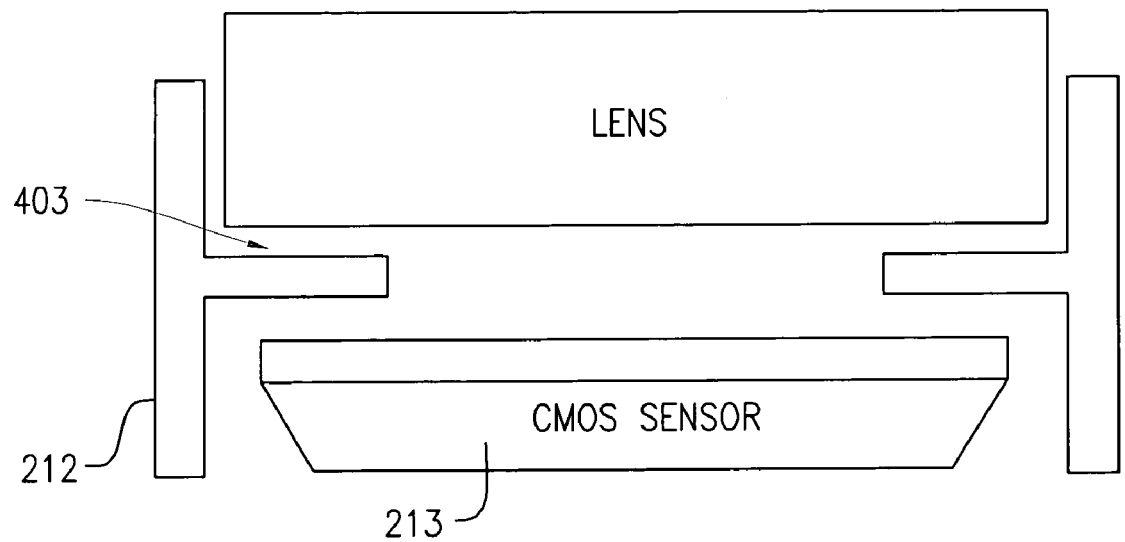
FIG. 4 shows an close up side view of a lens stopper in accordance with the present invention.

FIG. 4 shows an additional embodiment in which a lens stopper is built in to a portion of body 212 in order to provide a starting point for the adjustment of the lens. Also shown in FIG. 4 is the CMOS 213.

It is also noted that rather than blocking light through the PCB through holes via a connector or other opaque material, walls surrounding the CMOS may be utilized instead. However, this technique is less preferred as it may increase cost of the device.

It has also been determined that it is preferable to mount the CMOS or other sensor on the capturing PCB after all elements on the other side of the capturing PCB 214 have been mounted. This avoids heat damage to the CMOS sensor that would otherwise occur when parts are mounted on the other side of the sensor PCB which may require heat and or soldering.

Figure 5:
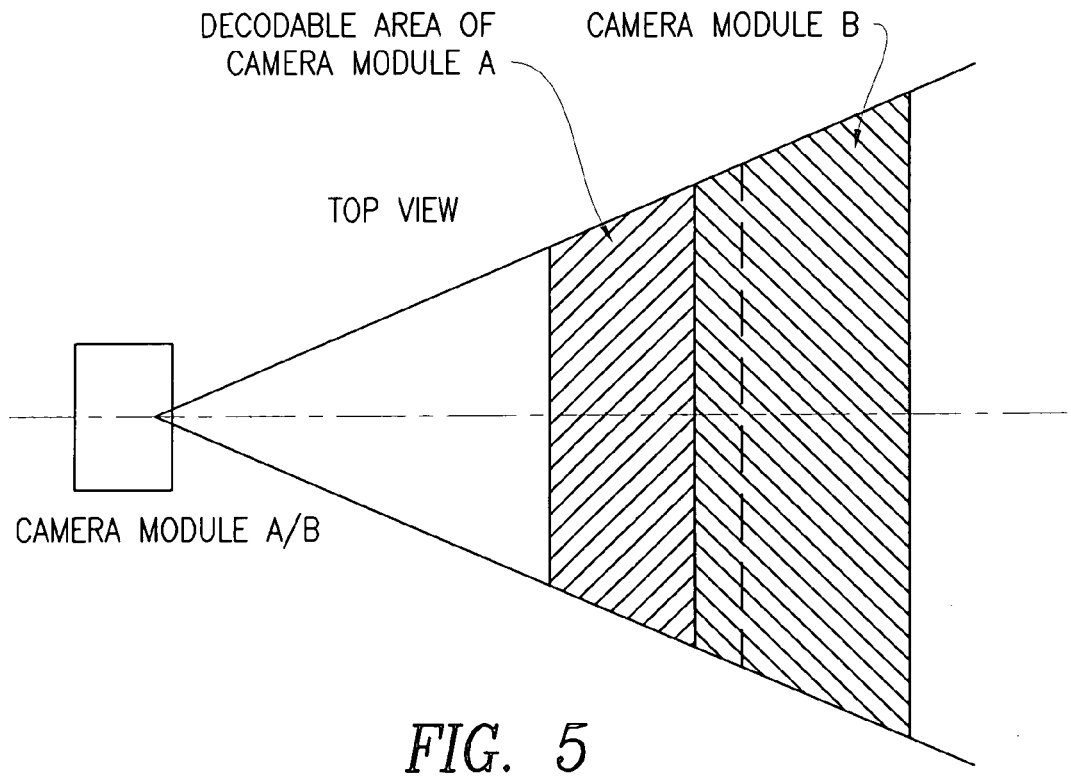
FIG. 5 depicts two different camera modules side by side.
Figure 6:
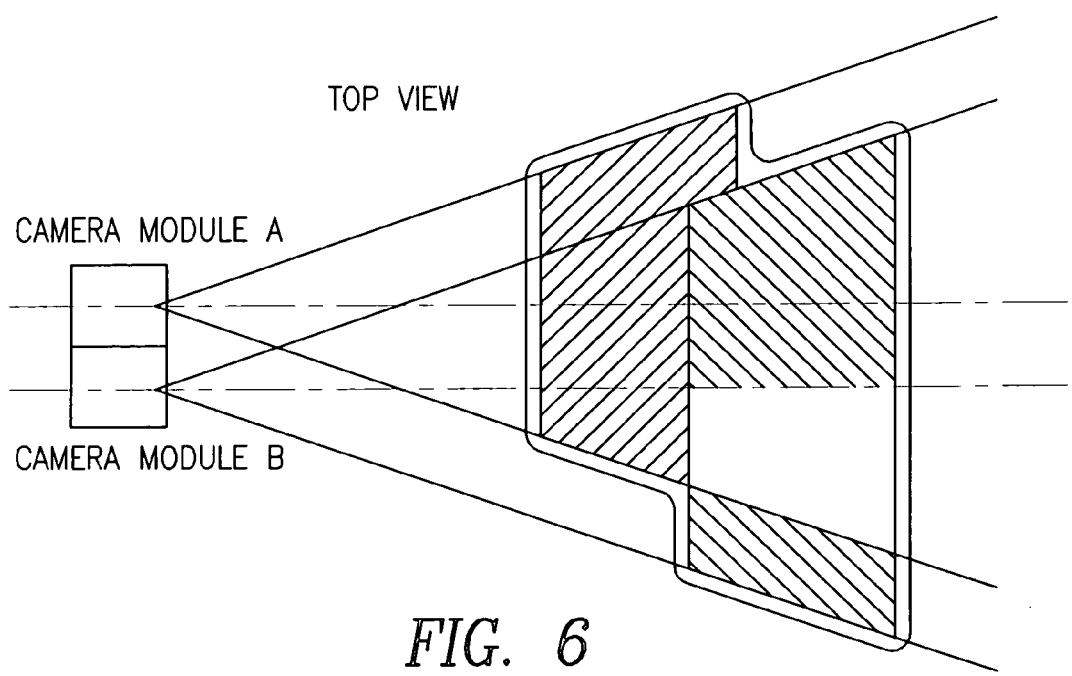
FIG. 6 depicts an additional view of the cameras of FIG. 5.

In accordance with another preferred embodiment to the invention, FIGS. 5 and 6 depict plural cameras with different focal lens that are mounted together in order to achieve a larger focal area. These cameras may be of the same or a different type than that described herein, but are preferably of the same type.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of assembling an image capture device having an illumination source and a receiving lens for focusing light received back from an image to be captured, said method comprising:
   adjusting a distance between said illumination source and a first body, thereby forming an assembled illumination element,
   separately adjusting a distance between said receiving lens and a detector, thereby forming a separately assembled camera module, and
   after completing the adjusting steps, connecting said separately assembled camera module to said assembled illumination element.

2. The method of claim 1 further comprising placing a mask on said first body, said mask including at least one lens that focuses light from said illumination source.

3. The method of claim 2 wherein said illumination source comprises a first source for illumination to be used for aiming said image capture device at a symbol to be captured, and a second source of illumination to be used for illuminating the image to be captured.

4. The method of claim 3 wherein said illumination source comprises a substantially flat element with an opening therethrough, and wherein said receiving lens extends through said opening when the illumination element is connected to the camera module.

5. The method of claim 1 wherein the camera module includes a printed circuit board with a sensor attached to a first side thereof and covering a first area on said first side, and wherein a second side thereof includes a opaque element mounted over an area, which overlies said first area on said first side.

6. A method of assembling an image capture device having an illumination source and a receiving lens for focusing light received back from an image to be captured, said method comprising adjusting a distance between said illumination source and a first body, thereby forming an illumination element, separately adjusting a distance between said receiving lens and a detector, thereby forming a camera module, and connecting said camera module to said illumination element;
   wherein the camera module includes a printed circuit board with a sensor attached to a first side thereof and covering a first area on said first side, and wherein a second side thereof includes a opaque element mounted over an area, which overlies said first area on said first side;
   wherein the area on the second side is smaller than the first area on the first side, but wherein the area on the second side is large enough to cover all through holes that fall within the area on the first side.

\* \* \* \* \*